United States Patent [19]

Hounsel

[11] Patent Number: 4,605,206
[45] Date of Patent: * Aug. 12, 1986

[54] SUSPENDED SEAL RING FOR LADLE PREHEATER

[75] Inventor: Mack A. Hounsel, Houston, Tex.

[73] Assignee: J T Thorpe Company, Houston, Tex.

[*] Notice: The portion of the term of this patent subsequent to Jan. 2, 2002 has been disclaimed.

[21] Appl. No.: 665,938

[22] Filed: Oct. 29, 1984

Related U.S. Application Data

[63] Continuation-in-part of Ser. No. 564,745, Dec. 21, 1983, Pat. No. 4,492,382.

[51] Int. Cl.⁴ ............................................. F27D 1/18
[52] U.S. Cl. ..................................... 266/283; 266/287
[58] Field of Search .............. 266/287, 286, 283, 280, 266/44, 901, 242; 432/224, 225, 250; 52/506, 509, 404; 227/12

[56] References Cited

U.S. PATENT DOCUMENTS

| | | | |
|---|---|---|---|
| 3,832,815 | 9/1974 | Balaz et al. | 52/404 |
| 3,952,470 | 4/1976 | Byrd, Jr. | 52/404 |
| 4,223,873 | 9/1980 | Battles | 266/901 |
| 4,229,211 | 10/1980 | Battles | 266/901 |
| 4,364,729 | 12/1982 | Fresch | 266/44 |
| 4,529,176 | 7/1985 | Bloom et al. | 266/283 |

Primary Examiner—L. Dewayne Rutledge
Assistant Examiner—S. Kastler
Attorney, Agent, or Firm—Pravel, Gambrell, Hewitt & Kimball

[57] ABSTRACT

Sealing rings are provided for ladle preheaters. The rings are mounted for relative movement into a stable, suspended position over the primary lining. Refractory fiber insulation is provided in the form of modules on an outer support ring. The rings seal about the ladle rim adjacent burner and flue openings of the preheater. Since the sealing ring may move over the primary lining, the ladle rim forms a seal with the modules and also forces the support ring into a second seal with the primary lining when the lining is refractory ceramic fiber.

17 Claims, 4 Drawing Figures

SUSPENDED SEAL RING FOR LADLE PREHEATER

CROSS-REFERENCE TO RELATED APPLICATIONS

This application is a continuation-in-part of copending U.S. patent application Ser. No. 564,745 filed Dec. 21, 1983, now U.S. Pat. No. 4,492,382.

BACKGROUND OF INVENTION:

1. Field of Invention:

The present invention relates to insulating and sealing rings for ladle preheaters.

2. Description of the Prior Art

Refractory ceramic fiber modules are becoming increasingly more common as insulative seals on ladle preheaters to seal against the ladle rim during preheating. U.S. Pat. No. 4,364,729 and U.S. Pat. No. 4,229,211 were examples of this type of ladle preheater seals formed of refractory ceramic fiber modules. In these systems, substantially the entire rectangular support frame or plate was covered with refractory ceramic fiber modules, such as those according to U.S. Pat. No. 4,001,996. These modules, typically having square prismic shape, were installed in a uniform grid pattern. Since the ladle rim was usually of circular or oval construction, the modules in the outer corners of the frame served no useful function other than support for the modules which did lie within the seal area. Establishing a circular or oval seal area with a uniform square grid pattern thus involved the use of inactive modules, which increased the cost of construction and maintenance.

U.S. Pat. No. 4,223,873, commonly owned with U.S. Pat. Nos. 4,364,729 and 4,229,211, was directed to a ladle preheater with a circular seal of compaction material. However, no structural details of this seal, or how it was to be installed and supported, were given. The rectangular ceramic fiber modules used for furnace wall insulation, such as those of U.S. Pat. No. 4,001,996 mentioned above, and others on the market did not lend themselves to forming circular seals. There were several ways that attempts could have been made to use them, but none were satisfactory. These square or rectangular modules could have been cut to fit a circular or oval seal pattern. This would have caused material waste and increased installation costs. Even more importantly, the structural integrity, and thus the compressive effects between adjacent modules, would be reduced. Alternatively, these modules could be arranged about a generally circular pattern, leaving gaps in spaces between adjacent rectangular modules where curved surfaces were necessary. This would require stuffing to be inserted in the spaces, increasing installation costs and resulting in irregular compressive effects.

Further, it would have been desirable in ladle preheaters of an earlier type, using refractory brick as a primary refractory between the ladle and the preheater, to obtain the benefits of refractory ceramic fiber insulation in the seal. However, the removal of the refractory brick and its replacement with rectangular fiber module systems of U.S. Pat. Nos. 4,364,729 and 4,229,211 would have required a complete retrofit, necessitating that the preheater be taken out of service for some considerable time.

Another problem common to both ceramic fiber and brick linings was caused by slag accumulating on the ladle rims in service. Due to the slag, the lining was often damaged in use, usually severely, requiring replacement. Until completion of replacement of damaged portions of the lining, the preheater had to be taken out of service. If repairs of the linings were not made, the steel shell of the preheater was subject to damage.

SUMMARY OF INVENTION

Briefly, the present invention provides a new and improved apparatus for sealing the rim of a ladle as it is positioned adjacent a primary insulative lining for a ladle preheater. A plurality of seal ring modules, each formed of a number of adjacent layers of refractory ceramic fiber insulating material, are mounted with a support ring. The layers of the refractory fiber are mounted with the support ring in a position having side portions of the layers adapted to be contacted by the ladle rim during preheating. The support ring is mounted with the preheater in a manner permitting relative movement between the primary insulative lining of the preheater, on the one hand, and the support ring and the modules on the other. The relative moment of the support ring and modules permits the support ring to be suspended in a stable position for service usage.

With the present invention, different sizes of seals can be made available for different ladles. Further, the primary lining is protected from damage by sealing forces. Thinner, and thus less expensive, primary linings may be used. Further, the suspended action of the seal provides a double sealing action, forming tighter seals with increasing sealing pressure when the primary lining is formed with a ceramic fiber. The suspended seal of the present invention can also be used over brick as a primary lining, as desired. Also, damaged seal rings or modules can be more easily replaced without requiring a long term shut down of the preheater.

DESCRIPTION OF PREFERRED EMBODIMENT

Figure 1:
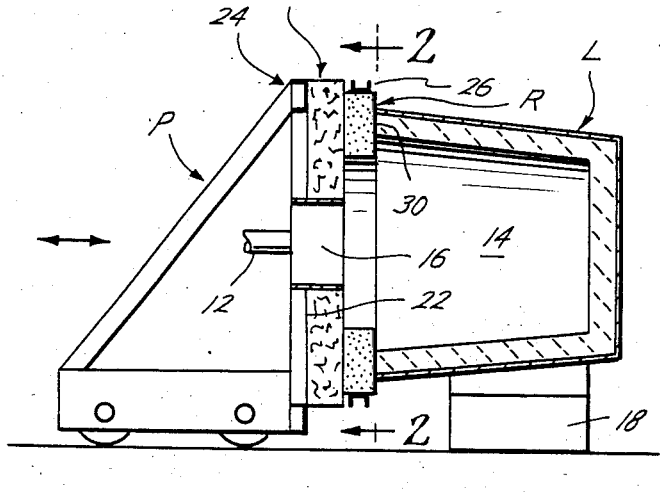
FIG. 1 is an elevation view, taken partly in cross-section, of a ladle preheater and ladle with a seal ring according to the present invention.
Figure 2:
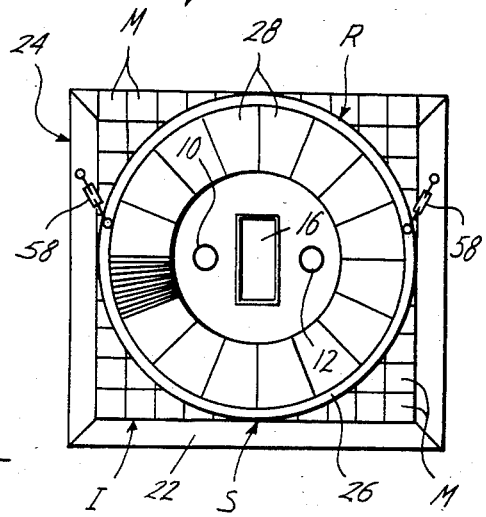
FIG. 2 is a view taken along the line 2—2 of FIG. 1.
Figure 3:
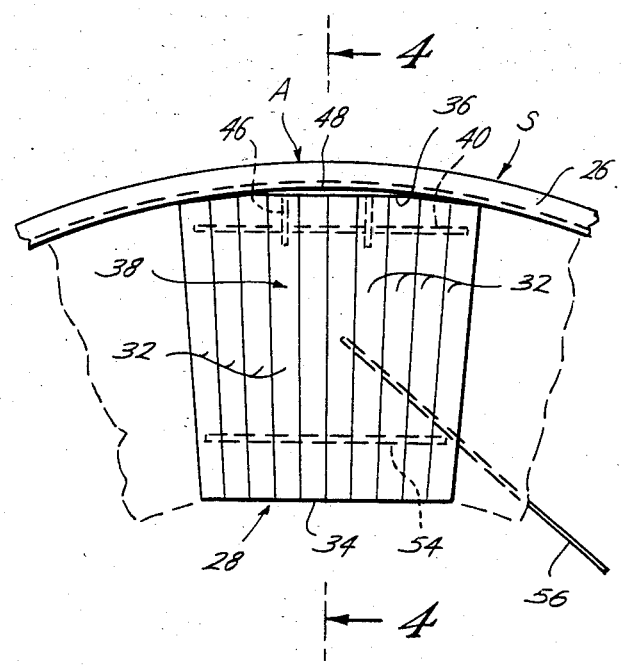
FIG. 3 is an enlarged view illustrating in detail the portion circled and having the reference numeral "3" designating same in FIG. 2.
Figure 4:
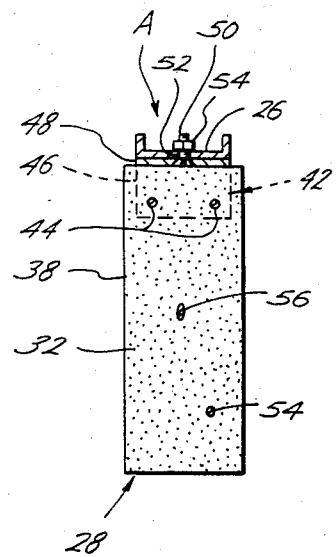
FIG. 4 is cross-sectional view taken along the line 4—4 of FIG. 3.

In the drawings, the letter R designates generally a suspended seal ring for sealing between a ladle L and a primary insulative lining I of a ladle preheater P. The preheater P is conventional and may be of any suitable construction, including burners 10 and 12 for injecting heated gases into an exterior portion 14 of the ladle L and a flue 16 for exhaust of combustion product gases. A stand 18 is mounted adjacent the ladle preheater P to support the ladle L during preheating operations. Since the preheater P is conventional and may be of any suitable type, further details thereof are not illustrated.

The primary insulative lining I of the preheater P is preferably of the form of a plurality of commonly available refractory ceramic fiber insulting modules M, such as those of the type disclosed in the U.S. Pat. Nos. 4,001,996 and 3,952,470, covering a front surface 22 of a rectangular support frame 24 of the preheater P. It should be understood, however, that the primary insulating lining I may equally as well be one formed of refractory bricks, castables or the like.

The seal ring R of the present invention includes a support ring S in the form of a channel frame member 26, formed of heavy rolled steal or other suitable material, and a plurality of seal rings modules 28 formed of refractory ceramic fiber insulation material. The support ring S is circular or elliptical in shape in order to conform to the shape of a rim 30 of the ladle L to be preheated.

The seal ring modules 28 are formed of a plurality of adjacent layers 32 of refractory ceramic fiber insulating material of an insulating capacity required by thermal conditions within the interior 14 of the ladle L. The ceramic fiber in the seal ring module 28 may be of a number of alternative configurations. For example, as illustrated, the ceramic fibers in the seal ring module 28 may take the form of a plurality of adjacent parallel layers mounted together in a substantially parallel fashion. Alternatively, the layers in the seal ring module 28 may have a number of folds formed at an inner surface 34 adapted to be exposed to conditions within the interior 14 of the ladle L during preheating.

The layers in the seal ring module 28 may also alternatively have folds formed at an outer surface 36 for contact with the channel frame member 26. Further, the layers of the seal ring module 28 may have folds formed at both the inner surface 34 an the outer surface 36 in the manner of U.S. Pat. No. 4,001,996. The outer surface 36 of the seal ring modules, of whatever form they are composed, is beveled, either by cutting or by bending or other techniques, to conform to the curvature of the seal ring S.

The seal ring modules 28 are mounted with the seal ring R by attachment structure A so that a side surface 38 is adapted to be contacted by the rim 30 of the ladle L during preheating by preheater P. The attachment structure A includes in the preferred embodiment a pair of support rods 40 extending transversely through adjacent layers of the refractory ceramic fiber insulating material in the module 28 and a channel member 42 which receives rods 40 therein. The rods 40 are inserted through suitable openings 44 formed in support arms 46 of the channel 42. The support arms 46 extend inwardly into the ceramic fiber material of the module 28 from an outer channel mamber 48. The channel member 48 of the attachment structure A includes a bolt 50 or other suitable means for cnnecting the support rods 40 with the support ring S. The bolt 50 is adapted to pass through suitable openings 52 in the channel frame member 26 and be attached to a nut 54 or other suitable attachment structure. If desired, the channel member 48 may be spot welded or otherwise suitably attached to the frame member 26.

For strength purposes, and to ensure that layers of the ceramic fiber in the seal ring module 28 are maintained as an integral unit, a stiffener rod 54 is usually mounted at a spaced position from the support rod 40, closed to the inner surface 34 of the seal ring module 28. After the seal ring modules 28 are installed, an impaling rod or stake 56 may be inserted to lock adjacent modules 28 to each other to provide unity and integrity of the seal formed by the modules 28.

The channel frame member 26 of the seal ring R is, according to the present invention, attached to the support frame 24 of the preheater P by a mechanism for forming a strong, but flexible, support. In the preferred embodiment, a pair of chain members 58 flexibly interconnect the support ring R with the support frame 56 of preheater P. It should be understood that other structure may be used, such as cables of suitable strength, in place of the chain members 58. The chain members 58 permit relative movement bewteen the seal ring R and the primary insulative lining I of the preheater P. Chain members 58 provide relative movement of the seal ring R in both the horizontal and vertical dimensions of the surface of the primary insulative lining I so that the seal ring R is suspended in a stable position. The ring R is also permitted some degree of relative inward and outward movement, thus permitting relative three-dimensional movement between the primary insulative lining I and the suspended seal ring R.

In the operation of the present invention, a channel frame member 26 of a size and configuration conforming to the rim 30 of the ladle L has seal ring modules 28 mounted about its interior surface, forming a circumferential inner seal with the side surfaces 38 of the modules 28 adapted to be engaged by the rim 30. The seal ring member R thus formed is attached by mounting chains 58 to the support frame 24 of the preheater P. As the ladle L is brought into contact with the preheater P for preheating, the rim 30 engages the surfaces 38 of the seal ring modules 28, forming a firm and effective seal to prevent escape of combustion gases from the interior 14 of the ladle L. When the primary insulative lining I is of a refractory ceramic fiber material, the channel frame member 26 is contacted by the rim 30 and is forced by the ladle L into the primary ceramic fiber insulated lining I, forming an additional or double seal.

With the present invention, different sizes and diameters of suspended seal rings R may be provided for a single preheater P dependent upon the size of ladles L being used. Prior to the present invention, sealing of different sized ladles against the primary insulative lining I caused sealing problems due to the creation or high and low spots in the lining formed during preheating operations, such as by contact with slag on the ladle L. With the suspended seal rings R, the primary lining I is removed from contact with the rim 30 of the ladle L and is thus protected from damage. Further, the primary insulative lining I may be reduced in thickness, since it is not subject to contact and damage.

If modules 28 in the seal ring R become damaged, they are early removed and quickly replaced without requiring a long term shutdown of the preheater P. Since the seal ring R floats over the primary lining I, the seal between the ring R and the primary lining R becomes tighter with increasing pressure, forming a double sealing action in the manner set forth above. If desired, gas ports or openings can be incorporated between the seal ring R and the primary lining I.

The foregoing disclosure and description of the invention are illustrative and explanatory thereof, and various changes in the size, shape and materials, as well as in the details of the illustrated construction may be made without departing from the spirit of the invention.

I claim:

1. An apparatus for sealing the rim of a ladle as it is positioned adjacent a primary insulative lining for a ladle preheater, comprising:
    (a) a plurality of seal ring modules, each of said modules comprising:
        (1) a plurality of adjacent layers of refractory ceramic fiber insulating material;

(2) said layers further having a side surface portion adapted to be contacted by the rim of the ladle during preheating of the ladle;

(3) said layers further being mounted in planes extending radially outwardly from a central portion of the ladle;

(b) support ring means for mounting said plurality of refractory fiber ring insulation units adjacent the primary insulative lining of the preheater; and (c) means for mounting said support ring means with the ladle preheater, said means for mounting further permitting relative movement between the primary insulative lining and said support ring and modules.

2. The apparatus of claim 1, wherein said modules include:
means for attaching said layers with said support ring means.

3. The apparatus of claim 2, wherein said means for mounting includes:
(a) support rod means mounted in said layers for supporting same; and
(b) means for connecting said support rod means with said support ring means.

4. The apparatus of claim 3, further including:
a stiffener rod mounted in said layers at a spaced position from said support rod means.

5. The apparatus of claim 1, wherein:
(a) said layers have an inner surface adapted to be exposed to conditions within the ladle during preheating; and
(b) said layers have an outer surface for contact with said support ring means.

6. The apparatus of claim 5, wherein:
(a) said support ring means has a curved inner surface; and
(b) said outer surface of said layers conforms to said inner surface of said support ring means.

7. The apparatus of claim 5, further including:
portions formed from adjacent ones of said purality of adjacent layers at said inner surface to form alternating inner folds.

8. The apparatus of claim 5, further including:
portions formed from adjacent ones of said plurality of adjacent layers at said outer surface to form alternating outer folds.

9. The aparatus of claim 5, further including:
portions formed from adjacent ones of said plurality of adjacent layers at said inner surface to form alternating inner folds; and
portions formed from adjacent ones of said plurality of adjacent layers at said outer surface to form alternating outer folds.

10. The apparatus of claim 1, wherein:
said seal ring modules are of different thickness than the primary insulative lining for the preheater.

11. The apparatus of claim 1, wherein said means for mounting comprises:
chain means for interconnecting said support rings means with the ladle preheater.

12. The apparatus of claim 1, wherein said means for mounting comprises:
means permitting relative three-dimensonal movement between the primary insulative lining and said support ring and modules.

13. The apparatus of claim 1, wherein the primary insulative lining for the ladle preheater is formed from refractory brick.

14. The apparatus of claim 1, where the primary insulative lining for the ladle preheater is formed from refractory ceramic fiber modules.

15. The apparatus of claim 14, wherein both said side surface portion of said layers and said support ring are adapted to be contacted by the ladle rim, and wherein:
(a) said ladle rim and said layers form a first seal therebetween; and
(b) said support ring is driven into a second seal with the refractory ceramic fiber modules of the primary insulative lining.

16. The apparatus of claim 1, wherein said support ring comprises a channel member extending about an outer surface of said ring seal modules.

17. The apparatus of claim 1, wherein said support ring and said seal ring modules conform in shape, at the seal formed thereby, to the ladle rim.

* * * * *